United States Patent
Zhang et al.

(10) Patent No.: US 9,451,312 B2
(45) Date of Patent: Sep. 20, 2016

(54) METHOD, TERMINAL, AND SYSTEM FOR SHARING INFORMATION WITH DIGITAL TELEVISION TERMINAL

(71) Applicant: Tencent Technology (Shenzhen) Company Limited, Shenzhen (CN)

(72) Inventors: Xiang Zhang, Shenzhen (CN); Wen Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 349 days.

(21) Appl. No.: 14/091,265

(22) Filed: Nov. 26, 2013

(65) Prior Publication Data

US 2014/0157339 A1 Jun. 5, 2014

Related U.S. Application Data

(63) Continuation of application No. PCT/CN2013/077686, filed on Jun. 21, 2013.

(30) Foreign Application Priority Data

Aug. 27, 2012 (CN) .......................... 2012 1 0307645

(51) Int. Cl.
*H04N 7/173* (2011.01)
*H04N 21/41* (2011.01)
(Continued)

(52) U.S. Cl.
CPC .... *H04N 21/4126* (2013.01); *H04N 21/43637* (2013.01); *H04N 21/4622* (2013.01)

(58) Field of Classification Search
CPC .................. H04N 21/4126; H04N 21/43637; H04N 21/4622
See application file for complete search history.

(56) References Cited

U.S. PATENT DOCUMENTS

2010/0274859 A1* 10/2010 Bucuk ........................... 709/206
2011/0210983 A1* 9/2011 Theimer et al. .............. 345/634
(Continued)

FOREIGN PATENT DOCUMENTS

| CN | 1617586 | 5/2005 |
| CN | 1764248 | 4/2006 |

(Continued)

OTHER PUBLICATIONS

First Office Action dated Jul. 23, 2014, directed towards CN Application No. 201210307645.0 with concise explanation of relevancy; 10 pages.

(Continued)

*Primary Examiner* — Oleg Asanbayev
(74) *Attorney, Agent, or Firm* — Anova Law Group, PLLC

(57) ABSTRACT

The present disclosure discloses a method of sharing information with digital television ("DTV") terminals and terminal and system for the same, the method comprising: establishing a communication connection between a DTV terminal and a mobile terminal; sending from the DTV terminal to the mobile terminal the DTV terminal's data receiving port information; and sending one or more multimedia files from the mobile terminal to the DTV terminal in accordance with the DTV terminal's data receiving port information. The present disclosure can accomplish information sharing between mobile terminals and DTV terminals, thereby realizing easy and convenient browsing or playback of multimedia files, taking advantage of DTVs' superior multimedia playback effect and avoiding the inconvenience brought about by wired connections.

12 Claims, 9 Drawing Sheets

(51) Int. Cl.
*H04N 21/462* (2011.01)
*H04N 21/4363* (2011.01)

(56) References Cited

U.S. PATENT DOCUMENTS

2011/0246945 A1* 10/2011 Caine et al. .......... 715/835
2013/0005296 A1* 1/2013 Papakostas et al. .......... 455/405

FOREIGN PATENT DOCUMENTS

| CN | 1937721 | 3/2007 |
| CN | 101321274 | 12/2008 |
| CN | 102064985 | 5/2011 |
| CN | 102104983 | 6/2011 |
| CN | 102404637 | 4/2012 |
| KR | 20120040000 A | 4/2012 |

OTHER PUBLICATIONS

Second Office Action dated Feb. 28, 2015, directed towards CN Application No. 201210307645.0 with concise explanation of relevancy; 4 pages.
Third Office Action dated Aug. 5, 2015, directed towards CN Application No. 201210307645.0 with concise explanation of relevancy; 5 pages.
International Search Report and Written Opinion mailed Sep. 26, 2013, directed to International Application No. PCT/CN2013/077686; 12 pages.

\* cited by examiner

METHOD, TERMINAL, AND SYSTEM FOR SHARING INFORMATION WITH DIGITAL TELEVISION TERMINAL

CROSS REFERENCE TO RELATED APPLICATIONS

This application is a U.S. continuation application under 35 U.S.C. §111(a) claiming priority, under 35 U.S.C. §120 and 365(c), to International Application No. PCT/CN2013/077686 filed on Jun. 21, 2013, which claims the priority benefit of Chinese Patent Application No. 201210307645.0, filed Aug. 27, 2012, the contents of both the PCT application and the Chinese application are incorporated by reference herein in their entirety for all purposes.

TECHNICAL FIELD

The present disclosure relates generally to the technological field of the Internet, and more particularly, to method, terminal, and system for sharing information with a digital television ("DTV") terminal.

BACKGROUND

As mobile terminals are becoming more and more widely used in our daily life, people have become more and more used to obtaining and saving all kinds of multimedia files using mobile terminals. Examples of the multimedia files include, but are not limited to, image files, audio files, and video files. Because mobile terminals' screen and audio effect are often limited by their mobility, i.e., as mobile as they are, their screens are small and their audio output are limited to integrated speakers, people may want to use DTV terminals to browse such multimedia files in order to gain better user experience. There are two ways to transfer the multimedia files from a mobile terminal to a DTV terminal. One way is to use a wired connection, such as a universal serial bus ("USB") connection, to connect the mobile terminal with the DTV terminal. The other way is to use a mobile storage medium to copy the multimedia files from the mobile terminal to the storage medium in the DTV, before such multimedia files can be played by the DTV terminal. There is a need for more convenient connections between mobile terminals and DTV terminals.

SUMMARY OF THE DISCLOSURE

One of the technical problems to be solved by embodiments of the present disclosure is to provide method, terminal, and system for sharing information with DTV terminals, thereby accomplishing sharing information with DTV terminals wirelessly.

To solve the above-identified technical problem, an embodiment in a first aspect of the disclosure provides a method of sharing information with a DTV terminal. The method comprises: establishing a communication connection between the DTV terminal and a mobile terminal; the DTV terminal sending data receiving port information associated with the DTV terminal to the mobile terminal; the mobile terminal sending one or more multimedia files to the DTV terminal via a data receiving port on the DTV terminal in accordance with the data receiving port information associated with the DTV terminal.

Accordingly, an embodiment in a second aspect of the disclosure provides another method of sharing information with a DTV terminal. The method comprises: obtaining network information associated with a mobile terminal and sending network information associated with the DTV terminal to the mobile terminal; sending data receiving port information associated with the DTV terminal to the mobile terminal based on the network information associated with the mobile terminal; and obtaining one or more multimedia files sent from the mobile terminal to the DTV terminal, wherein the one or more multimedia files are sent from the mobile terminal to the DTV terminal based on the network information and the data receiving port information associated with the DTV terminal.

Accordingly, an embodiment in a third aspect of the disclosure provides another method of sharing information with a DTV terminal. The method comprises: sending network information associated with a mobile terminal to the DTV terminal and obtaining network information associated with the DTV terminal; obtaining data receiving port information associated with the DTV terminal sent from the DTV terminal to the mobile terminal, wherein the data receiving port information associated with the DTV terminal is sent from the DTV terminal to the mobile terminal based on the network information associated with the mobile terminal; sending one or more multimedia files to the DTV terminal based on the network information and the data receiving port information associated with the DTV terminal.

Accordingly, an embodiment in a fourth aspect of the disclosure provides a DTV terminal. The DTV terminal comprises: a first connection establishing module that obtains network information associated with a mobile terminal and that sends to the mobile terminal network information associated with the DTV terminal; a data receiving port information sending module that sends to the mobile terminal data receiving port information associated with the DTV terminal based on the network information associated with the mobile terminal; and a multimedia file obtaining module that obtains multimedia files sent from the mobile terminal to the DTV terminal, wherein the multimedia files are sent from the mobile terminal to the DTV terminal based on the network information and the data receiving port information associated with the DTV terminal.

Accordingly, an embodiment in a fifth aspect of the disclosure provides a mobile terminal. The mobile terminal comprises: a second connection establishing module that sends network information associated with the mobile terminal to a DTV terminal and that obtains network information associated with the DTV terminal; a data receiving port information obtaining module that obtains data receiving port information associated with the DTV terminal sent from the DTV terminal to the mobile terminal, wherein the data receiving port information associated with the DTV terminal is sent from the DTV terminal to the mobile terminal based on the network information associated with the mobile terminal; and a multimedia file sending module that sends multimedia files to the DTV terminal based on the network information and the data receiving port information associated with the DTV terminal.

Accordingly, an embodiment in a sixth aspect of the disclosure provides a server. The server comprises: a network information obtaining module that obtains network information associated with a DTV terminal sent from the DTV terminal or network information associated with a mobile terminal sent from the mobile terminal; an account managing module that obtains login accounts from the DTV terminal and the mobile terminal, and that searches for opposite terminals with a relevant account in accordance with the DTV terminal's or the mobile terminal's login account, and a network information sending module that sends the network information associated with the DTV terminal to a mobile terminal that has logged in an account relevant to the DTV terminal's login account, or that sends the network information associated with the mobile terminal to a DTV terminal that has logged in an account relevant to the mobile terminal's login account.

Accordingly, an embodiment in a seventh aspect of the disclosure provides an information sharing system. The system comprises a DTV terminal such as described in the fourth aspect of the disclosure and a mobile terminal such as described in the fifth aspect of the disclosure, wherein the DTV terminal is configured to establish a communication connection with the mobile terminal, to send data connection port information associated with the DTV terminal to the mobile terminal, and to obtain one or more multimedia files from the mobile terminal, and the mobile terminal is configured to establish the communication connection with the DTV terminal, to obtain from the DTV terminal the data connection port information associated with the DTV terminal, and to send the one or more multimedia files to the DTV terminal.

Accordingly, an embodiment in an eighth aspect of the disclosure provides a computer-readable storage medium storing one or more programs. The one or more programs comprise instructions, which when executed by one or more computers, cause the one or more computers to carry out some or all of the steps in accordance with the first, second or third aspect of the disclosure.

By establishing a wireless communication connection between DTV terminals and mobile terminals, embodiments of the disclosure accomplish information sharing between mobile terminals and DTV terminals, thereby realizing easy and convenient browsing or playback of multimedia files, taking advantage of DTVs' superior multimedia playback effect and avoiding the inconvenience brought about by wired connections.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Examples of DTV terminals that can be used in accordance with various embodiments include, but are not limited to, DTV set-top boxes, smart TVs, integrated DTVs, and any terminal that can provide DTV services. Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 1:
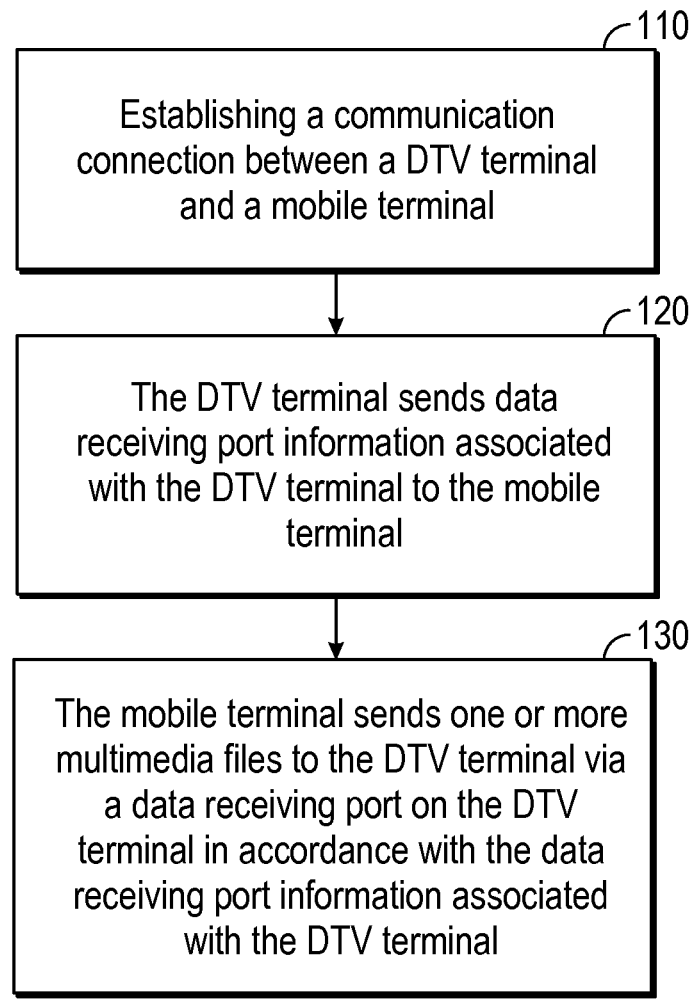
FIG. 1 is a schematic diagram illustrating an example of the flow of a method of sharing information with a DTV terminal according to various embodiments.

FIG. 1 is a schematic diagram illustrating an example of the flow of a method of sharing information with a DTV terminal according to various embodiments. The method can comprise the following steps.

Step 110: establishing a communication connection between the DTV terminal and a mobile terminal. According to some embodiments, if the DTV terminal and the mobile terminal are in a same local area network ("LAN"), they can each wirelessly broadcast a detecting message carrying their respective network information. According to these embodiments, one of them can listen and obtain the detecting message broadcast by the other and respond by giving its own network information, thereby allowing mutual discovery and the establishment of the connection between the two terminals. According to some other embodiments, if the DTV terminal and the mobile terminal are not within a same LAN, then the connection between them can be established by exchanging their respective network information via a server. As used herein, "network information" can comprise a terminal's network identification and listening port information. As used herein, "network identification" can include a terminal's Internet Protocol ("IP") address or Media Access Control ("MAC") address, and optionally the terminal's network ID, name, and other terminal identifications.

As used herein, a terminal's listening port information can comprise information about the ports on the terminal used for signaling exchange with other terminals.

Step 120: the DTV terminal sends data receiving port information associated with the DTV terminal to the mobile terminal. According to some embodiments, a DTV terminal can send the data receiving port information associated with the DTV terminal to a mobile terminal via the communication connection established in step 110. According to some embodiments, the data receiving port can be a separate listening port assigned by the DTV terminal specifically for the mobile terminal to transfer file data. According to some other embodiments, the data receiving port can be the listening port included in the network information sent by the DTV terminal to the mobile terminal, as described in step 110. According to some embodiments, the listening port can be a Transmission Control Protocol ("TCP") port.

Step 130: the mobile terminal sends information such as one or more multimedia files to the DTV terminal via a data receiving port on the DTV terminal in accordance with the data receiving port information associated with the DTV terminal. According to some embodiments, after receiving data receiving port information associated with a DTV terminal, a mobile terminal can send multimedia files stored in it to the DTV terminal via a communication connection established between it and the DTV terminal, such as one established in accordance with step 110. According to some embodiments, a mobile terminal can select or collect multimedia files stored in its storage medium or program cache first before sending the selected or collected multimedia files to the DTV terminal.

According to some embodiments, a DTV terminal can, after it has received a multimedia file from a mobile terminal, perform such operations to the multimedia file as browsing, playing, editing or uploading the multimedia file to the Internet. According to some embodiments, a DTV terminal can, after it has received more than one multimedia file from one or more mobile terminals, classify the multimedia files it has received. Methods of such classification are well known to those skilled in the art, and can include, but are not limited to, classification based on the identification information obtained from the mobile terminals, or classification based on the time of receipt of the multimedia files. According to some embodiments, the mobile terminal's identification information can be the identification information included in the network information sent to the DTV terminal from the mobile terminal in accordance with step 110. The DTV terminal can then classify the multimedia files based on one or more identifications such as IP address, MAC address and other terminal identifications included in the network information associated with the mobile terminal, such that multimedia files obtained from a same mobile terminal can be classified into one group. According to some other embodiments, a classification based on the time of receipt of the multimedia files can be in accordance with different periods of time. For example, multimedia files received more than a month ago can be classified into one group, those received more than one week ago but less than one month ago can be classified into another group, and those received more than 24 hours ago but less than one week ago can be classified into yet another group, etc. According to yet some other embodiments, a classification based on the time of receipt of the multimedia files can be simply in accordance with different dates, such that multimedia files received on a same date are classified into a same group, while those received on different dates are classified into different groups.

Figure 2:
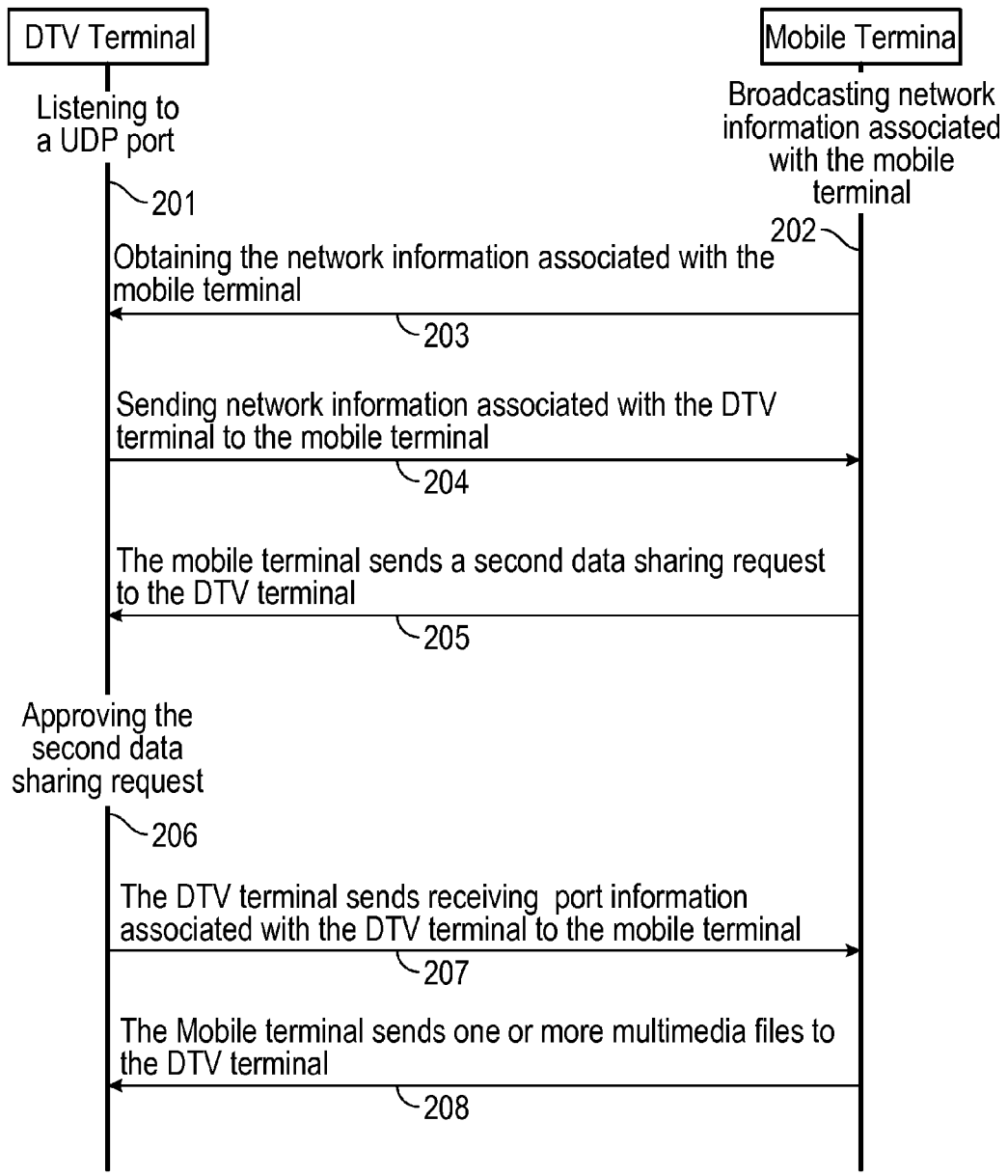
FIG. 2 is a schematic diagram illustrating an example of the flow of a method of sharing information with a DTV terminal according to various embodiments.

FIG. 2 is a schematic diagram illustrating an example of the flow of a method of sharing information with a DTV terminal according to various embodiments. In this example, the information being shared is multimedia files, both the mobile terminal and the DTV terminal are in a same wireless LAN, and the multimedia sharing process is initiated by the mobile terminal. The method can comprise the following steps.

Step 201: the DTV terminal automatically runs a listening program and listens to a default port, such as a User Datagram Protocol ("UDP") port, to listen to detecting messages sent wirelessly within a LAN.

Step 202: the mobile terminal broadcasts network information associated with the mobile terminal. According to some embodiments, a mobile terminal can broadcast network information associated with the mobile terminal by way of wirelessly broadcasting in the LAN detecting messages specific for a default UDP port, thereby allowing a DTV terminal to receive the network information associated with the mobile terminal by listening to the default UDP port. The network information associated with the mobile terminal can comprise the mobile terminal's network identification and listening port information. The network identification can comprise the mobile terminal's IP address or MAC address, and optionally the mobile terminal's network ID, name, and other terminal identifications. The listening port information can comprise the port number of a default TCP port the mobile terminal uses to conduct signaling exchange with other terminals.

Step 203: the DTV terminal obtains the network information associated with the mobile terminal through the default UDP port. According to some embodiments, a DTV terminal can save network information associated with a mobile terminal it has obtained through the default UDP port, and display that it has detected the mobile terminal.

Step 204: the DTV terminal sends network information associated with the DTV terminal to the mobile terminal, thereby establishing a communication connection with the mobile terminal. According to some embodiments, network information associated with a DTV terminal can be similar to the network information broadcast by a mobile terminal, and can comprise network identification of the DTV terminal and its listening port information. The network identification can comprise the DTV terminal's IP address or MAC address, and optionally the DTV terminal's network ID, name, and other terminal identifications. Listening port information can comprise the port number of a default TCP port on the DTV terminal used by the DTV terminal to conduct signaling exchange with other terminals. According to some embodiments, the mobile terminal can, after it has received network information associated with a DTV terminal, save the network information associated with the DTV terminal, terminate the detection and the broadcast of its own network information, and prompt a user that the mobile terminal has successfully registered with the DTV terminal. According to some embodiments, if the mobile terminal does not receive a response from the DTV terminal within a certain period of time, it can re-broadcast information about itself. According to some embodiments, if the mobile terminal does not receive a response from the DTV terminal after a certain number of retries, it can prompt a user that its detection has failed and that it has not found any available DTV terminal.

Step 205: the mobile terminal sends a second data sharing request to the DTV terminal. According to some embodiments, a mobile terminal can send the second data sharing request in accordance with a user's operation command and via an established communication connection with a DTV terminal. According to some embodiments, a mobile terminal can send the second data sharing request to a DTV terminal in accordance with the IP address and listening port information, or the MAC address and listening port information, contained in the DTV terminal's network information. By way of example only, a user may wish to browse on a DTV terminal pictures recently taken by a mobile terminal. She can enter a command into the mobile terminal to initiate the sending of the second data sharing request from the mobile terminal to the DTV terminal. Those skilled in the art will readily appreciate that, instead of having the mobile terminal send a second data sharing request to the DTV terminal, the DTV terminal can initiate sending a first data sharing request to the mobile terminal to request to share multimedia files stored in the mobile terminal. Transfer of the multimedia files can occur subsequent to the mobile terminal approving the first data sharing request from the DTV terminal.

Step 206: the DTV terminal approves the second data sharing request. According to some embodiments, the DTV terminal can, after receiving a second data sharing request, display the request and approve the data sharing request in accordance with an operation command entered by a user to approve the second data sharing request.

Step 207: the DTV terminal sends data receiving port information associated with the DTV terminal to the mobile terminal. According to some embodiments, a DTV terminal can send data receiving port information associated with the DTV terminal to a mobile terminal via an established communication connection with the mobile terminal. The data receiving port can be a TCP port assigned by the DTV terminal to be used for data transfer with the mobile terminal. The data receiving port information can comprise such information as the port number of the port. According to some embodiments, a DTV terminal can send data receiving port information associated with the DTV terminal to a mobile terminal after a successful establishment of communication connection with the mobile terminal, thereby obviating the need for either the mobile terminal or the DTV terminal to send any data sharing request to the other terminal. According to these embodiments, therefore, steps 205 and 206 described above can be omitted.

Step 208: the mobile terminal sends one or more multimedia files to the DTV terminal via a data receiving port on the DTV terminal in accordance with the data receiving port information associated with the DTV terminal. According to some embodiments, a mobile terminal can send a multimedia file to a DTV terminal via an established communication connection and in accordance with the data receiving port information associated with the DTV terminal. According to some embodiments, a mobile terminal can send a multimedia file to a DTV terminal in accordance with the IP address or MAC address in network information associated with the DTV terminal and with data receiving port information associated with the DTV terminal. According to some embodiments, a DTV terminal can receive a multimedia file sent from a mobile terminal by listening to the data receiving port, and can allow a user to, in accordance with commands entered by the user, browse, play, save, classify, and share the multimedia file to the Internet, etc.

Figure 3:
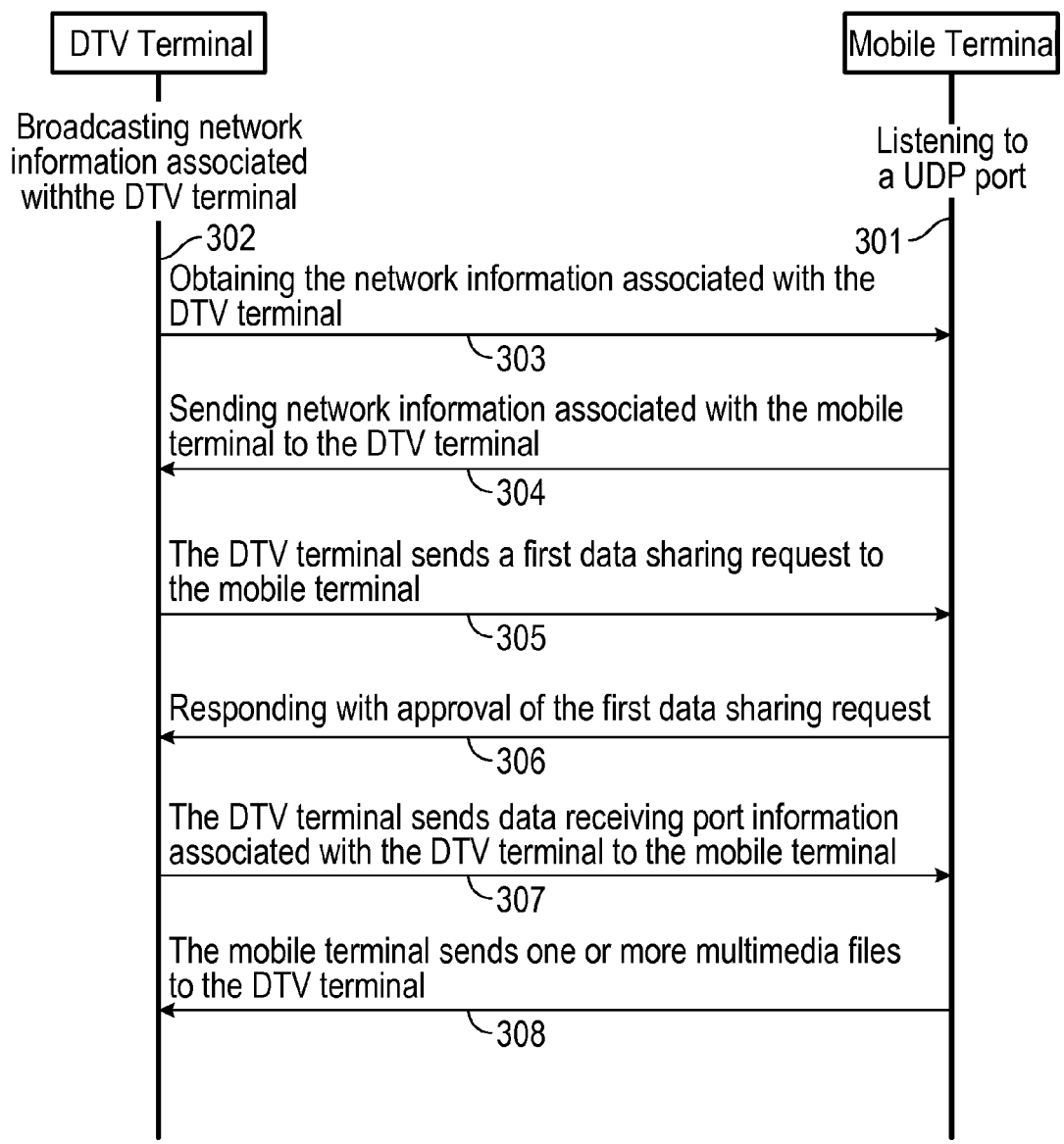
FIG. 3 is a schematic diagram illustrating an example of the flow of a method of sharing information with a DTV terminal according to various embodiments.

FIG. 3 is a schematic diagram illustrating an example of the flow of a method of sharing information with a DTV terminal according to various embodiments. In this example, the information being shared is multimedia files, both the mobile terminal and the DTV terminal are in a same wireless LAN, and the multimedia sharing process is initiated by the DTV terminal. The method can comprise the following steps.

Step 301: a mobile terminal automatically runs a listening program after it is turned on and listens to a default UDP port to listen to detecting messages sent wirelessly within a LAN.

Step 302: a DTV terminal broadcasts network information associated with the DTV terminal. According to some embodiments, a DTV terminal can broadcast network information associated with the DTV terminal by wirelessly broadcasting a detecting message specific for a default UDP port within a LAN, thereby allowing a mobile terminal to receive the network information associated with the DTV terminal by listening to the default UDP port. The network information associated with the DTV terminal can comprise the DTV terminal's network identification and listening port information. The network identification can comprise the DTV terminal's IP address or MAC address, and optionally the DTV terminal's network ID, name, and other terminal identifications. The listening port information can comprise the port number of a default TCP port the DTV terminal uses to conduct signaling exchange with other terminals.

Step 303: the mobile terminal obtains the network information associated with the DTV terminal through the default UDP port. According to some embodiments, a mobile terminal can, after receiving network information associated with a DTV terminal via a UDP port, save the network information associated with the DTV terminal and display that it has detected the DTV terminal.

Step 304: the mobile terminal sends network information associated with the mobile terminal to the DTV terminal, thereby establishing a communication connection with the DTV terminal. According to some embodiments, network information associated with a mobile terminal can be similar to the network information broadcast by a DTV terminal, and can comprise network identification of the mobile terminal and its listening port information. The network identification can comprise the mobile terminal's IP address or MAC address, and optionally the mobile terminal's network ID, name, and other terminal identifications. The listening port information can comprise the port number of a default TCP port the mobile terminal uses to conduct signaling exchange with other terminals. According to some embodiments, after receiving network information associated with a mobile terminal, a DTV terminal can save the network information associated with the mobile terminal, terminate the detection and the broadcast of its own network information, and prompt a user that it has successfully connected to an available mobile terminal. According to some embodiments, if a DTV terminal has not received a response from a mobile terminal within a certain period of time, the DTV terminal can re-broadcast its own information. According to some embodiments, if the DTV terminal does not receive any response from a mobile terminal after a certain number of retries, it can prompt a user that its detection has failed and that it has not found any available mobile terminal.

Step 305: the DTV terminal sends a first data sharing request to the mobile terminal. According to some embodiments, a DTV terminal can send the first data sharing request in accordance with a user's operation command and via an established communication connection with a mobile terminal. According to some embodiments, a DTV terminal can send the first data sharing request to a mobile terminal in accordance with the IP address and listening port information, or the MAC address and listening port information, contained in network information associated with a mobile terminal. By way of example only, a user may wish to browse on a DTV terminal when watching the DTV pictures recently taken by a mobile terminal. She can enter a command via a remote control into the DTV terminal such that the DTV terminal sends a first data sharing request to the mobile terminal. Optionally, a second data sharing request can also be initiated by a mobile terminal and sent to a DTV terminal to request to share multimedia files in the mobile terminal with the DTV terminal. Subsequent file transfer can occur after the DTV terminal approves the second data sharing request sent from the mobile terminal.

Step 306: the mobile terminal sends a response to the DTV terminal approving the first data sharing request. According to some embodiments, a mobile terminal can, after receiving a first data sharing request, display the request and send a response to a DTV terminal approving the first data sharing request in accordance with an operation command entered by a user to approve the first data sharing request.

Step 307: the DTV terminal sends data receiving port information associated with the DTV terminal to the mobile terminal. According to some embodiments, a DTV terminal can, after receiving a response from a mobile terminal approving the first data sharing request, send data receiving port information associated with the DTV terminal to the mobile terminal via an established communication connection with the mobile terminal. The data receiving port can be a TCP port specifically assigned by the DTV terminal for data transfer with the mobile terminal. The data receiving port information can comprise such information as the port number of the port. According to some embodiments, a DTV terminal can send data receiving port information associated with the DTV terminal to a mobile terminal after a successful establishment of communication connection with the mobile terminal, thereby obviating the need for either the mobile terminal or the DTV terminal to send any data sharing request to the other terminal. According to these embodiments, therefore, steps 305 and 306 described above can be omitted.

Step 308: the mobile terminal sends one or more multimedia files to the DTV terminal via a data receiving port on the DTV terminal in accordance with the data receiving port information associated with the DTV terminal. According to some embodiments, this step can be the same as step 208, which has been described in detail hereinabove.

Figure 4:
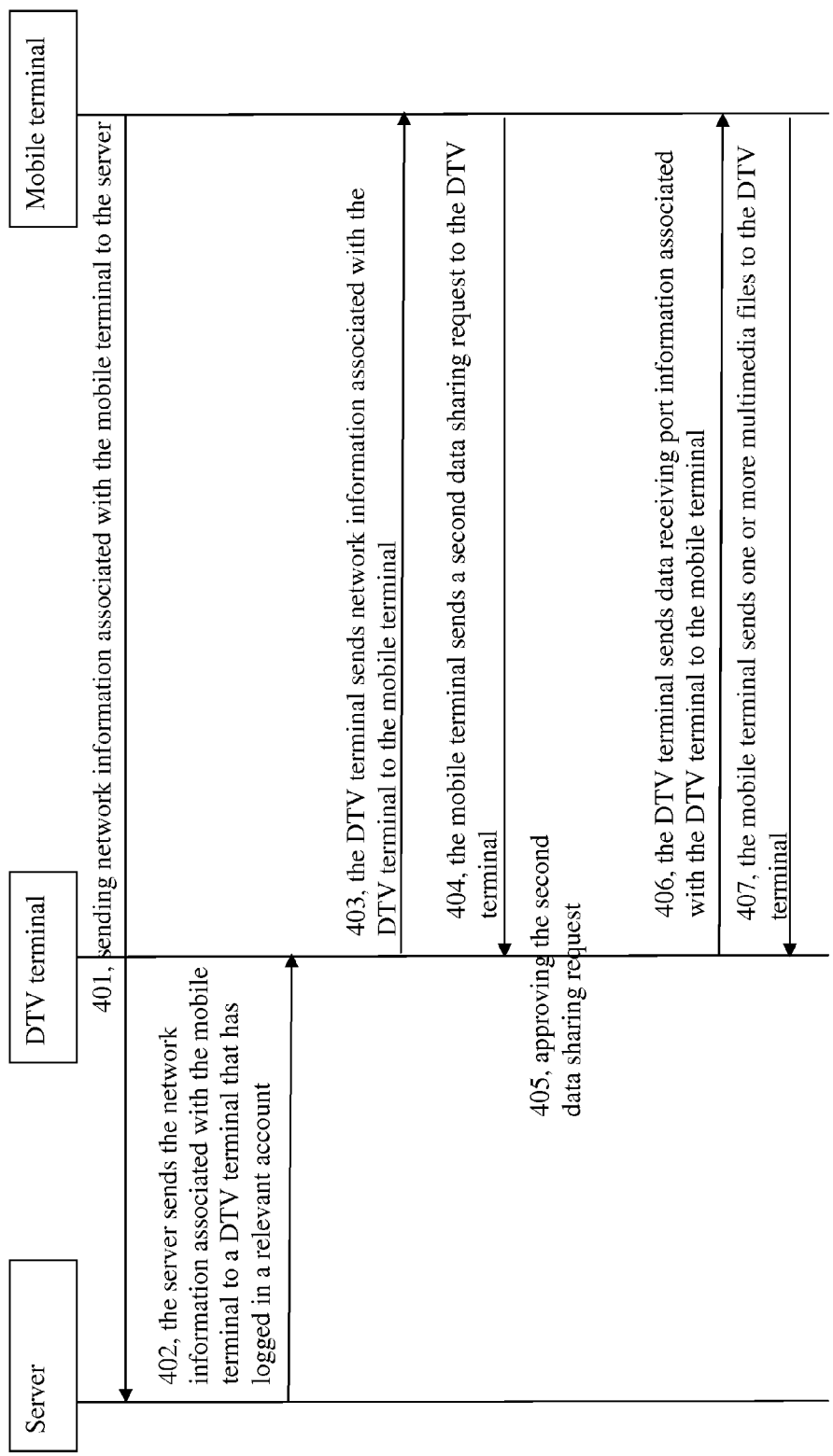
FIG. 4 is a schematic diagram illustrating an example of the flow of a method of sharing information with a DTV terminal according to various embodiments.

FIG. 4 is a schematic diagram illustrating an example of the flow of a method of sharing information with a DTV terminal according to various embodiments. In this example, the information being shared is multimedia files, and the mobile terminal and the DTV terminal are not in a same LAN. The method can comprise the following steps.

Step 401: a mobile terminal send network information associated with the mobile terminal to a server. According to some embodiments, a mobile terminal can send network information associated with the mobile terminal to a server when it is logging in the server. According to some other embodiments, a mobile terminal can send network information associated with the mobile terminal to a server after it has logged in the server. Network information associated with a mobile terminal can comprise the mobile terminal's network identification and listening port information. The network identification can comprise the mobile terminal's IP address or MAC address, and optionally the mobile terminal's network ID, name, and other terminal identifications. The listening port information can comprise the port number of a default TCP port the mobile terminal uses to conduct signaling exchange with other terminals.

Step 402: the server sends the network information associated with the mobile terminal to a DTV terminal that has logged in a relevant account. According to some embodiments, after logging in a server, a DTV terminal can actively obtain from the server network information associated with a mobile terminal having an account associated with the account which the DTV terminal has used to log in the server. According to some embodiments, a server can search for a mobile terminal which has logged in the server using a relevant account for a DTV terminal in accordance with the login accounts of both the DTV terminal and the mobile terminal, and send network information associated with the mobile terminal to the DTV terminal. According to some embodiments, a mobile terminal and a DTV terminal can have a same software application by which they log in a server. According to some other embodiments, a mobile terminal and a DTV terminal can have different software applications for logging in a server, as long as they have associated accounts or a common account. Examples of software applications that can be used to log in a server in accordance with various embodiments include, but are not limited to, music playback software, audio/video playback software, network browsers, and instant messaging programs. As used herein, a "relevant account" means that a program account logged in on a mobile terminal and a program account logged in on a DTV terminal are associated accounts, or accounts bound together, or a same account.

Step 403: the DTV terminal sends network information associated with the DTV terminal to the mobile terminal. According to some embodiments, a DTV terminal can send network information associated with the DTV terminal to a mobile terminal based on network information associated with the mobile terminal obtained from a server. Network information associated with a DTV terminal can comprise the DTV terminal's network identification and listening port information. The network identification can comprise the DTV terminal's IP address or MAC address and optionally the DTV terminal's network ID, name, and other terminal identifications. The listening port information can comprise the port number of a default TCP port the DTV terminal uses to conduct signaling exchange with other terminals. Because the DTV terminal has obtained from the serer the mobile terminal's IP address and port number, etc., it can directly send network information associated with the DTV terminal to the mobile terminal. Obtaining network information associated with a DTV terminal by a mobile terminal in this way accomplishes mutual discovery and the establishment of communication connection between the DTV and the mobile terminal via the server.

Step 404 through step 407 are an example of a process of multimedia file transfer based on a communication connection between a mobile terminal and a DTV terminal. The process can comprise the following steps. The mobile terminal sends a second data sharing request to the DTV terminal. The DTV terminal approves the second data sharing request and sends data receiving port information associated with the DTV terminal to the mobile terminal. The mobile terminal then sends one or more multimedia files to the DTV terminal via a data receiving port on the DTV terminal in accordance with the data receiving port information associated with the DTV terminal. This process is the same as the process in steps 205 through 208, which have been described in detail hereinabove.

Even though the above example has been described in terms of a process of establishing a communication connection initiated by a DTV terminal, and a request to share multimedia files sent from a mobile terminal to the DTV terminal, those skilled in the art can readily appreciate that the same principle can be applied to a process where a mobile terminal initiates the establishment of a communication connection or a process where a DTV terminal sends to a mobile terminal a request to share multimedia files.

Figure 5:
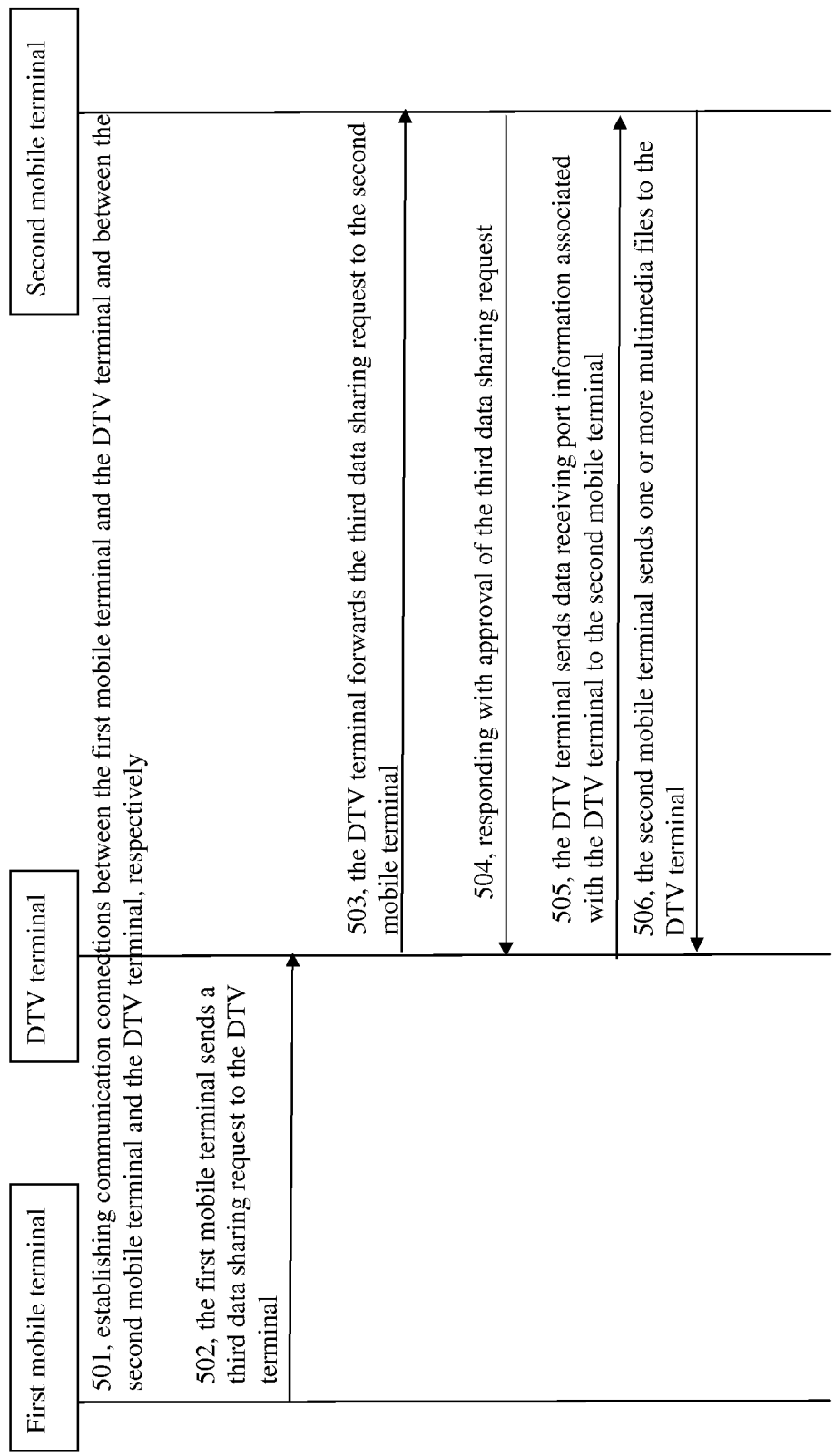
FIG. 5 is a schematic diagram illustrating an example of the flow of a method of sharing information with a DTV terminal according to various embodiments.

FIG. 5 is a schematic diagram illustrating an example of the flow of a method of sharing information with a DTV terminal according to various embodiments. In this example, the information being shared is multimedia files. The method can comprise the following steps.

Step 501: establishing communication connections between a first mobile terminal and a DTV terminal and between a second mobile terminal and the DTV terminal, respectively. According to some embodiments, establishing respective communication connections between a first mobile terminal and a DTV terminal and between a second mobile terminal and the DTV terminal can be via a method described in steps 201 through 204 hereinabove. According to some other embodiments, establishing respective communication connections between a first mobile terminal and a DTV terminal and between a second mobile terminal and the DTV terminal can be via a method described in steps 301 through 304 hereinabove.

Step 502: the first mobile terminal sends a third data sharing request to the DTV terminal. According to some embodiments, after both a first mobile terminal and a second mobile terminal have successfully established communication connections with a DTV terminal, the first mobile terminal can obtain from the DTV terminal information about other terminals that have established communication connections with the DTV terminal, thereby allowing the first mobile terminal to know that the second mobile terminal has successfully established communication connection with the DTV terminal. If a user wishes to browse on the DTV terminal multimedia files stored in the second mobile terminal, the first mobile terminal can send a third data sharing request specific to the second mobile terminal to the DTV terminal. According to some embodiments, the third data sharing request can comprise network identification associated with the second mobile terminal.

Step 503: the DTV terminal forwards the third data sharing request to the second mobile terminal. According to some embodiments, after receiving the third data sharing request, the second mobile terminal can know that it was the first mobile terminal that wanted to search or browse the second mobile terminal's information via the server, and can decide whether to approve the request in accordance with user input.

Step 504: the second mobile terminal sends a response to the DTV terminal approving the third data sharing request.

Step 505: the DTV terminal sends data receiving port information associated with the DTV terminal to the second mobile terminal. According to some embodiments, a DTV terminal can, after receiving a response from a second mobile terminal approving the third data sharing request, send data receiving port information associated with the DTV terminal to the second mobile terminal via an established communication connection with the second mobile terminal. The data receiving port can be a TCP port specifically assigned by the DTV terminal for data transfer with the second mobile terminal. The data receiving port information can comprise such information as the port number of the port. According to some embodiments, a third data sharing request a DTV terminal sends to a second mobile terminal can carry data receiving port information associated with the DTV terminal.

Step 506: the second mobile terminal sends one or more multimedia files to the DTV terminal, thereby accomplishing the sharing of information in the second mobile terminal with the first mobile terminal via the DTV terminal.

Some or all of the steps of a method of sharing information with a DTV terminal, such as those illustrated in FIGS. 1-5 and described in detail hereinabove, can be carried out by executing a program. The program can be stored in a computer-readable storage medium. Accordingly, the present disclosure discloses a computer-readable storage medium in accordance with various embodiments.

Figure 6:
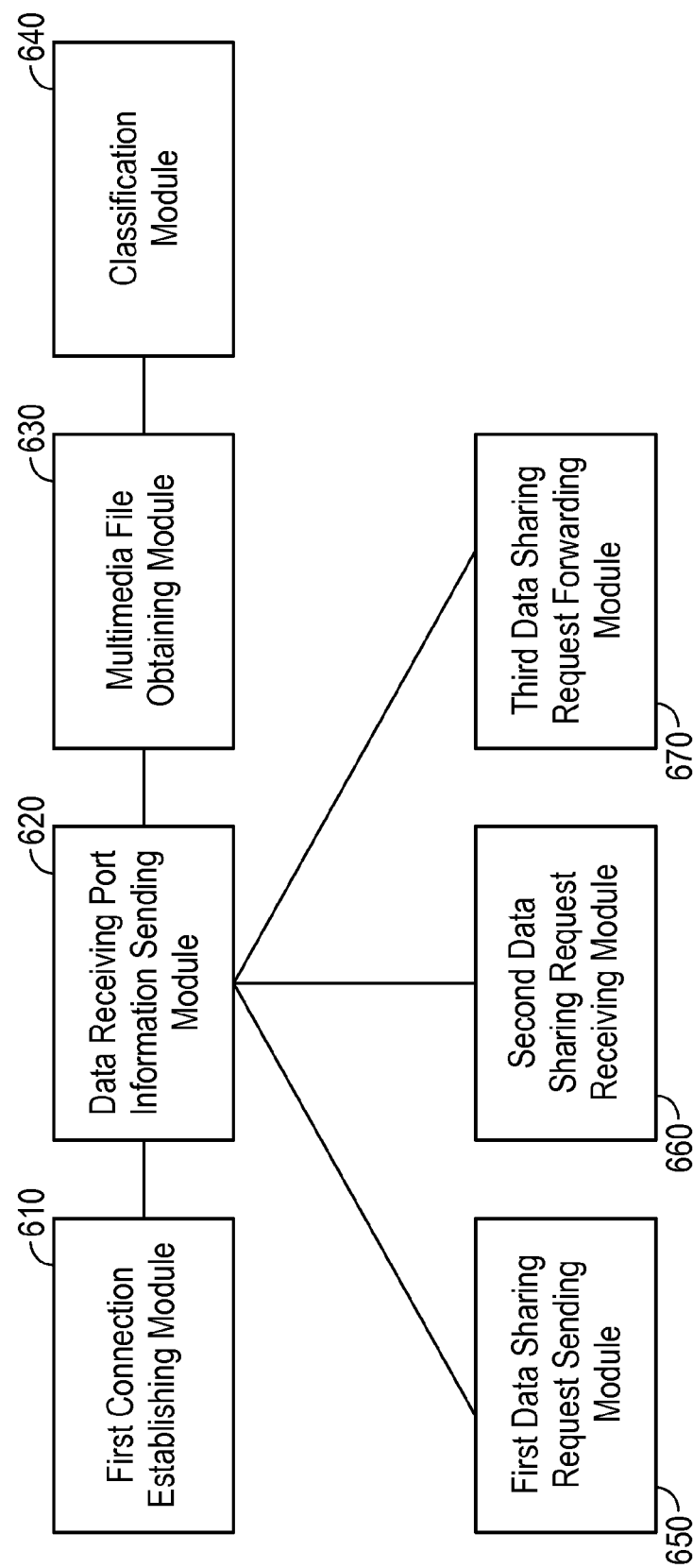
FIG. 6 is a schematic diagram illustrating an example of an arrangement of a DTV terminal according to various embodiments.
Figure 7:
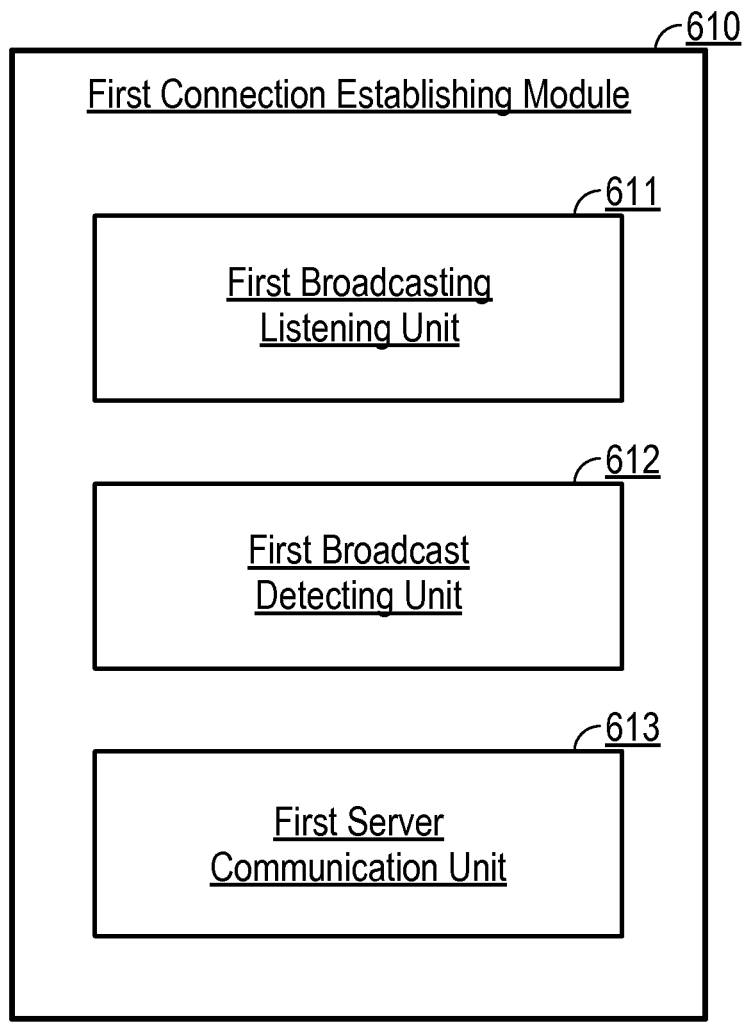
FIG. 7 is a schematic diagram illustrating an example of arrangement of a first connection establishing module 610 of a DTV terminal according to various embodiments.

FIG. 6 is a schematic diagram illustrating an example of an arrangement of a DTV terminal according to various embodiments. The DTV terminal can comprise:

A first connection establishing module 610 that obtains network information associated with a mobile terminal and that sends network information associated with the DTV terminal to the mobile terminal, thereby establishing a communication connection between the mobile terminal and the DTV terminal. The network information can comprise the network identification and listening port information of the corresponding terminals. The network identification can comprise the IP address or MAC address of a corresponding terminal, and optionally its network ID, name, and other terminal identifications. The listening port information can comprise such information as the port number of a port on a corresponding terminal for conducting signaling exchange with other terminals. According to some embodiments, a first connection establishing module 610 can comprise at least one of the following three units, as illustrated in FIG. 7:

A first broadcast listening unit 611 that obtains network information broadcast by a mobile terminal, and that sends network information associated with the DTV terminal to the mobile terminal based on the network information associated with the mobile terminal. According to some embodiments, a first broadcast listening unit 611 can automatically run a listening program after a DTV terminal is turned on, to listen to a default UDP port and listen to detecting messages sent wirelessly within a LAN. When a mobile terminal broadcasts in the LAN a detecting message carrying network information associated with the mobile terminal, the first broadcast listening unit 611 can obtain the network information associated with the mobile terminal via the UDP port it listens to, and send network information associated with the DTV terminal to the mobile terminal based on the network information associated with the mobile terminal, thereby accomplishing mutual discovery and the establishment of communication connection between the mobile terminal and the DTV terminal.

A first broadcast detecting unit 612 that broadcasts network information associated with the DTV terminal, and that obtains network information associated with a mobile terminal sent by the mobile terminal to the DTV terminal, wherein the network information associated with the mobile terminal is sent by the mobile terminal to the DTV terminal based on the network information associated with the DTV terminal. According to some embodiments, a first broadcast detecting unit 612 can broadcast network information associated with a DTV terminal by wirelessly broadcasting detecting messages specific to a default UDP port in a LAN, thereby allowing a mobile terminal listening to the default UDP port in the LAN to receive the network information associated with the DTV terminal. According to some embodiments, a first broadcast detecting unit 612 can further receive network information associated with a mobile terminal sent from the mobile terminal to the DTV terminal, wherein the network information associated with the mobile terminal is sent from the mobile terminal to the DTV terminal based on the network information associated with the DTV terminal, thereby accomplishing mutual discovery and the establishment of communication connection between the mobile terminal and the DTV terminal.

A first server communication unit 613 that obtains network information associated with a mobile terminal via a server, and that sends the network information associated with the DTV terminal to the mobile terminal based on the network information associated with the mobile terminal. Alternatively, the first network communication unit 613 can send the network information associated with the DTV terminal to a server and obtain the network information associated with the mobile terminal sent by the mobile terminal to the DTV terminal, wherein the network information associated with the mobile terminal is sent by the mobile terminal to the DTV terminal based on the network information associated with the DTV terminal. According to some embodiments, a mobile terminal can send network information associated with the mobile terminal to a server after it has logged in the server. A DTV terminal can obtain from the server via its first server communication unit 613 network information associated with a mobile terminal that has logged in the server, after the DTV terminal has similarly logged in the server. The DTV terminal can then send network information associated with the DTV terminal to the mobile terminal based on the obtained network information associated with the mobile terminal, thereby accomplishing mutual discovery and the establishment of communication connection between the mobile terminal and the DTV terminal. Alternatively, the first server communication unit 613 can send the network information associated with the DTV terminal to the server when or after the DTV terminal logs in the server. The server can send the network information associated with the DTV terminal to a mobile terminal that has logged in a relevant account. The mobile terminal can, after receiving the network information associated with the DTV terminal from the server, send network information associated with the mobile terminal to the DTV terminal based on the network information associated with the DTV terminal, thereby accomplishing mutual discovery and the establishment of communication connection between the mobile terminal and the DTV terminal. As used herein, a "relevant account" means that a program account logged in on a mobile terminal and a program account logged in on a DTV terminal are associated accounts, or accounts bound together, or a same account. According to some embodiments, a server can help a mobile terminal and a DTV terminal that have both logged in the server using a relevant account find each other in accordance with the login account information of the programs on the respective DTV terminal and mobile terminal.

A data receiving port information sending module 620 that sends data receiving port information associated with the DTV terminal to a mobile terminal based on network information associated with the mobile terminal. According to some embodiments, the data receiving port information sending module 620 can send data receiving port information associated with the DTV terminal to a mobile terminal via a communication connection with the mobile terminal established via the first connection establishing module 610. The data receiving port can be a TCP port assigned by the DTV terminal for data transfer with the mobile terminal and the data receiving port information can comprise such information as the port number of the port. Optionally, the data receiving port information can adopt the listening port information contained in the network information sent from a DTV terminal to a mobile terminal.

A multimedia file obtaining module 630 that obtains multimedia files sent from a mobile terminal based on the network information and the data receiving port information associated with the DTV terminal. According to some embodiments, a mobile terminal can send multimedia files to a DTV terminal via a communication connection with the DTV terminal established by the first connection establishing module 610 and based on the data receiving port information associated with the DTV terminal. According to some embodiments, a mobile terminal can send multimedia files to a DTV terminal based on the IP address or MAC address contained in the network information associated with the DTV terminal and on the data receiving port information associated with the DTV terminal. By listening to the data receiving port, the multimedia file obtaining module 630 can receive the multimedia files sent from a mobile terminal.

Optionally, a DTV terminal according to some embodiments can further comprise at least one of the following three modules:

A first data sharing request sending module 650 that sends a first data sharing request to a mobile terminal based on network information associated with the mobile terminal. According to some embodiments, the first data sharing request sending module 650 can, in accordance with a user's operation command, send a first data sharing request to a mobile terminal via a communication connection established by the first connection establishing module 610. According to some embodiments, the first data sharing request sending module 650 can send a first data sharing request in accordance with the IP address and the listening port information or the MAC address and the listening port information contained in network information associated with a mobile terminal. By way of example only, a user may wish to browse on a DTV terminal when watching the DTV pictures recently taken by a mobile terminal. She can enter a command via a remote control into the DTV terminal such that the first data sharing request sending module 650 sends a first data sharing request to the mobile terminal. When the first data sharing request sending module 650 receives a message from the mobile terminal approving the first data sharing request, it can notify the data receiving port information sending module 620 to send data receiving port information to the mobile terminal.

A second data sharing request receiving module 660, configured to obtain a second data sharing request sent from a mobile terminal to the DTV terminal, wherein the second data sharing request is sent from the mobile terminal to the DTV terminal based on network information associated with the DTV terminal. According to some embodiments, a mobile terminal can, in accordance with a user's operation command and via a communication connection with a DTV terminal established by the first connection establishing module 610, send a second data sharing request to the DTV terminal. According to some embodiments, a mobile terminal can, in accordance with a user's operation command and via a communication connection with a DTV terminal established by the first connection establishing module 610, send a second data sharing request to the DTV terminal in accordance with the IP address and listening port information or the MAC address and listening port information contained in network information associated with the DTV terminal. By way of example only, a user may wish to browse on a DTV terminal pictures recently taken using a mobile terminal. She can enter a command into the mobile terminal such that the mobile terminal sends a second data sharing request to the DTV terminal. The second data sharing request receiving module 660 can then receive the second data sharing request sent from the mobile terminal by listening to a port corresponding to the listening port information contained in the network information associated with the DTV terminal. The second data sharing request receiving module 660 can prompt a user to choose whether to approve the second data sharing request and, after obtaining the approval, notify the data receiving port information sending module 620 to send data receiving port information to the mobile terminal.

A data sharing request forwarding module 670 that obtains a third data sharing request from a mobile terminal, and forwards the third data sharing request to another mobile terminal. According to some embodiments, when a DTV terminal establishes communication connections with multiple mobile terminals using a first connection establishing module 610, a mobile terminal that has established communication connection with the DTV terminal can obtain from the DTV terminal information about other mobile terminals that have established communication connections with the DTV terminal. By way of example only, a user of a first mobile terminal may wish to browse information in a second mobile terminal via a DTV terminal. The first mobile terminal can send a third data sharing request to the DTV terminal. After the data sharing request forwarding module 670 receives the third data sharing request, it can forward the data sharing request to the second mobile terminal, the information in which has been requested by the first mobile terminal. When the data sharing request forwarding module 670 receives a message from the second mobile terminal approving the third data sharing request, it can notify the data receiving port information sending module 620 to send data receiving port information to the second mobile terminal.

According to some embodiments, a DTV terminal can additionally comprise:

A classification module 640 that classifies multimedia files obtained by a multimedia file obtaining module. According to some embodiments, such classification can comprise classification in accordance with obtained identification information of mobile terminals or in accordance with time of receipt of the received multimedia files. After a DTV terminal obtains a multimedia file from a mobile terminal, it can perform such operations to the multimedia file as browsing, playing, editing and uploading to the Internet. According to some embodiments, a DTV terminal can also classify multimedia files it has obtained using the classification module 640. Classification by the classification module 640 can comprise classification in accordance with obtained identification information of mobile terminals or in accordance with time of receipt of the received multimedia files. A mobile terminal's identification information can be the mobile terminal's identification information contained in the mobile terminal's network information, which can be obtained by the first connection establishing module 610. According to some embodiments, a DTV terminal can classify multimedia files in accordance with the IP address, MAC address or any one or more terminal identifications in network information associated with a mobile terminal, such that multimedia files obtained from a same mobile terminal are classified in a same group. According to some embodiments, a classification based on the time of receipt of the multimedia files can be in accordance with different periods of time. For example, multimedia files received more than a month ago can be classified into one group, those received more than one week ago but less than one month ago can be classified into another group, and those received more than 24 hours ago but less than one week ago can be classified into yet another group, etc. According to yet some other embodiments, a classification based on the time of receipt of the multimedia files can be simply in accordance with different dates, such that multimedia files received on a same date are classified into a same group, while those received on different dates are classified into different groups.

Figure 8:
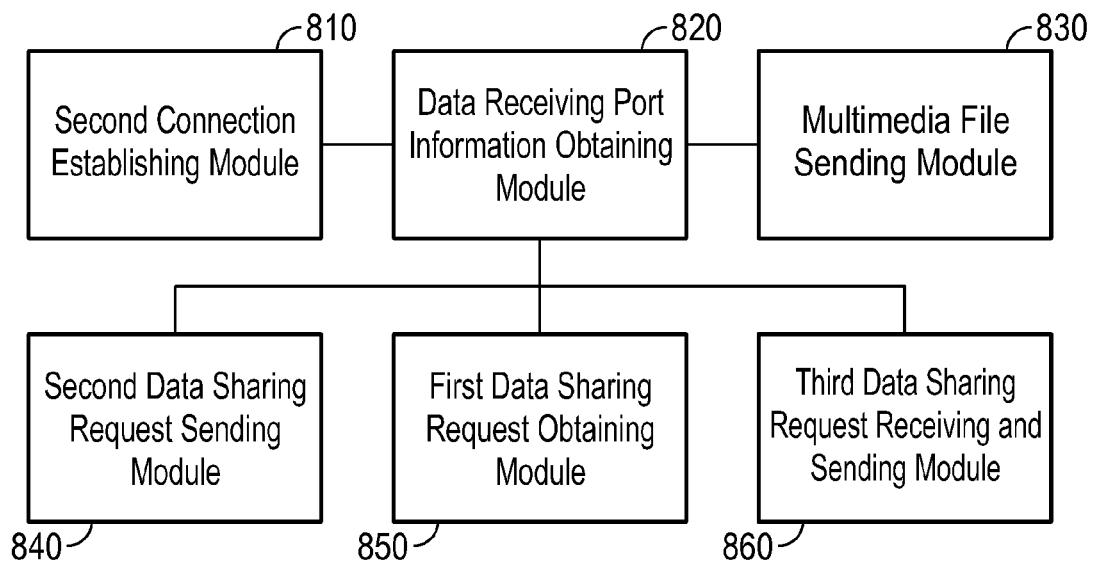
FIG. 8 is a schematic diagram illustrating an example of an arrangement of a mobile terminal according to various embodiments.
Figure 9:
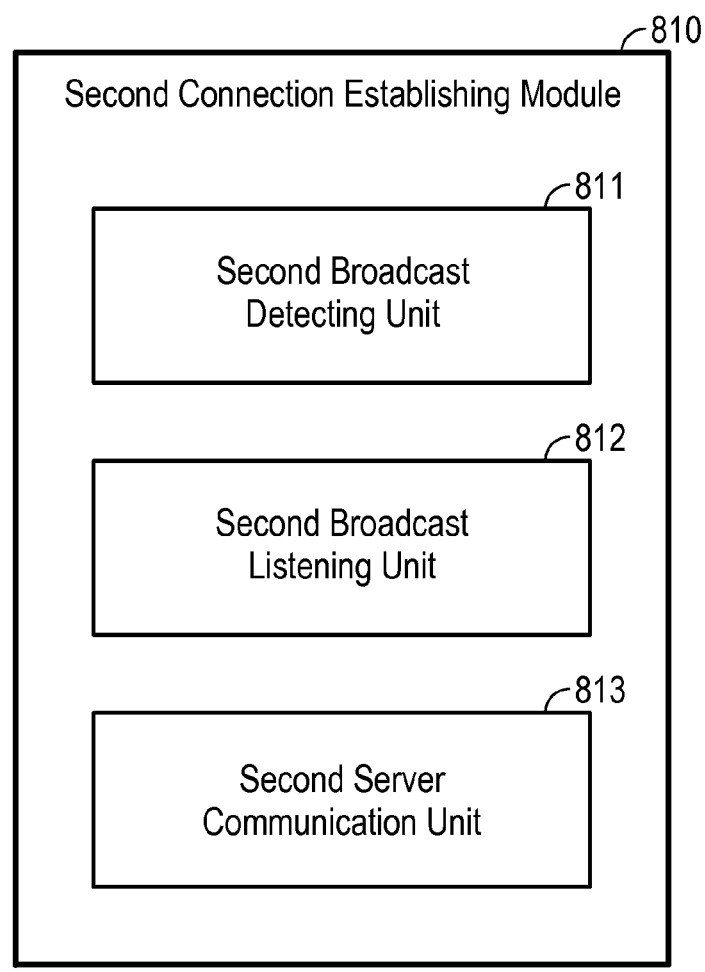
FIG. 9 is a schematic diagram illustrating an example of an arrangement of a second connection establishing module 810 of a mobile terminal according to various embodiments.

FIG. 8 is a schematic diagram illustrating an example of an arrangement of a mobile terminal according to various embodiments. The mobile terminal can comprise:

A second connection establishing module 810 that sends the network information associated with the mobile terminal to a DTV terminal, and that obtains network information associated with the DTV terminal. The network information can comprise a corresponding terminal's network identification and listening port information. The network identification can comprise the corresponding terminal's IP address or MAC address, and optionally the terminal's network ID, name, and other terminal identifications. The listening port information can comprise such information as the port number of the port the corresponding terminal uses to conduct signaling exchange with other terminals. According to some embodiments, the second connection establishing module 810 can comprise at least one of the following three units, as illustrated in FIG. 9:

A second broadcast detecting unit 811 that broadcasts the network information associated with the mobile terminal, and that obtains the network information associated with the DTV terminal sent from the DTV terminal to the mobile terminal based on the network information associated with the mobile terminal. According to some embodiments, the second broadcast detecting unit 811 can broadcast the network information associated by the mobile terminal by wirelessly broadcasting a detecting message specific to a default UDP port in a LAN, thereby allowing a DTV terminal in the LAN to receive the network information associated with the mobile terminal by listening to the default UDP port. The second broadcast detecting unit 811 can then receive network information associated with the DTV terminal sent from the DTV terminal to the mobile terminal, wherein the network information associated with the DTV terminal is sent from the DTV terminal to the mobile terminal based on the network information associated with the mobile terminal, thereby accomplishing mutual discovery and the establishment of communication connection between the mobile terminal and the DTV terminal.

A second broadcast listening unit 812 that obtains the network information broadcast by the DTV terminal, and that sends the network information associated with the mobile terminal to the DTV terminal based on the network information associated with the DTV terminal. According to some embodiments, the second broadcast listening unit 812 can automatically run a listening program after the mobile terminal is turned on, and listen to a default UDP port, thereby listening to detecting messages wirelessly sent in the LAN. When a DTV terminal broadcasts a detecting message carrying network information associated with the DTV terminal in the LAN, the second broadcast listening unit 812 can obtain the network information broadcast by the DTV terminal via a UDP port it listens to, and send network information associated with the mobile terminal to the DTV terminal based on the network information associated with the DTV terminal, thereby accomplishing mutual discovery and the establishment of communication connection between the mobile terminal and the DTV terminal.

A second server communication unit 813 that sends network information associated with the mobile terminal to a server, and that obtains network information associated with a DTV terminal sent from the DTV terminal to the mobile terminal based on the network information associated with the mobile terminal. According to some other embodiments, the second server communication unit 813 can obtain network information associated with a DTV terminal from a server and send network information associated with the mobile terminal to the DTV terminal based on the network information associated with the DTV terminal. According to some embodiments, the second server communication unit 813 can send network information associated with a mobile terminal when or after the mobile terminal logs in a server. The server can, in accordance with the mobile terminal's login account information, send the network information associated with the mobile terminal to a DTV terminal that has logged in a relevant account. The DTV terminal can, after receiving the network information associated with the mobile terminal from the server, send the network information associated with the DTV terminal to the mobile terminal based on the network information associated with the mobile terminal. The second server communication unit 813 can then obtain the network information associated with the DTV terminal, thereby accomplishing mutual discovery and the establishment of communication connection between the mobile terminal and the DTV terminal. According to some other embodiments, a DTV terminal can send network information associated with the DTV terminal to a server when or after it logs in the server. The server can, in accordance with the DTV terminal's account login information, send the network information associated with the DTV terminal to a mobile terminal that has logged in a relevant account. The second server communication unit 813 can receive from the server the network information associated with the DTV terminal and, based on the network information associated with the DTV terminal, send the network information associated with the mobile terminal to the DTV terminal. The DTV terminal can then receive the network information associated with the mobile terminal, thereby allowing mutual discovery and the establishment of connection between the mobile terminal and the DTV terminal. As used herein, a "relevant account" means that a program account logged in on a mobile terminal and a program account logged in on a DTV terminal are associated accounts, or accounts bound together, or a same account. According to some embodiments, a server can help a mobile terminal and a DTV terminal that have both logged in the server using a relevant account find each other in accordance with the login account information of the programs on the respective DTV terminal and mobile terminal.

A data receiving port information obtaining module 820 that obtains data receiving port information associated with a DTV terminal sent from the DTV terminal to the mobile terminal, wherein the data receiving port information associated with the DTV terminal is sent from the DTV terminal to the mobile terminal based on network information associated with the mobile terminal. According to some embodiments, a DTV terminal can send data receiving port information associated with the DTV terminal to a mobile terminal via a communication connection with the mobile terminal established by the second connection establishing module 810. The data receiving port information obtaining module 820 can receive the data receiving port information associated with the DTV terminal by listening to the port corresponding to the listening port information contained in the network information associated with the mobile terminal. The data receiving port can be a TCP port assigned by the DTV terminal for data transfer with the mobile terminal, and the data receiving port information can comprise such information as the port number of the port. Optionally, the data receiving port information can comprise the listening port information contained in the network information sent from a DTV terminal to a mobile terminal.

A multimedia file sending module 830 that sends multimedia files to a DTV terminal in accordance with the DTV terminal's network identification and data receiving port information associated with the DTV terminal. According to some embodiments, the multimedia file sending module 830 can send multimedia files to a DTV terminal via a communication connection with the DTV terminal established by the second connection establishing module 810 and in accordance with the DTV terminal's data receiving port information. According to some embodiments, the multimedia file sending module 830 can send multimedia files to a DTV terminal via a communication connection with the DTV terminal established by the second connection establishing module 810 and in accordance with the IP address or MAC address contained in the DTV terminal's network information and with the data receiving port information associated with the DTV terminal. According to some embodiments, a DTV terminal can receive multimedia files sent from a mobile terminal by listening to the data receiving port.

Optionally, a mobile terminal according to various embodiments can comprise at least one of the following three modules:

A second data sharing request sending module 840 that sends a second data sharing request to a DTV terminal based on network information associated with the DTV terminal. According to some embodiments, the second data sharing request sending module 840 can, in accordance with a user's operation command and via a communication connection established by the second connection establishing module 810, send a second data sharing request to a DTV terminal. According to some embodiments, the second data sharing request sending module 840 can, in accordance with a user's operation command and via a communication connection established by the second connection establishing module 810, send a second data sharing request to a DTV terminal in accordance with the IP address and listening port information or the MAC address and the listening port information contained in network information associated with the DTV terminal. By way of example only, a user may wish to browse on a DTV terminal pictures recently taken by a mobile terminal. She can enter a command into the mobile terminal such that the second data sharing request sending module 840 sends a second data sharing request to the DTV terminal. The DTV terminal can, by listening to a port corresponding to the listening port information contained in network information associated with the DTV terminal, receive the second data sharing request sent from the second data sharing request sending module 840.

A first data sharing request obtaining module 850 that obtains a first data sharing request sent from a DTV terminal to the mobile terminal, wherein the first data sharing request is sent from the DTV terminal to the mobile terminal based on network information associated with the mobile terminal. According to some embodiments, a DTV terminal can send a first data sharing request to a mobile terminal in accordance with a user's operation command and via a communication connection established by the second connection establishing module 810. According to some embodiments, a DTV terminal can send a first data sharing request to a mobile terminal in accordance with a user's operation command, via a communication connection established by the second connection establishing module 810, and in accordance with the IP address and listening port information or the MAC address and the listening port information contained in network information associated with the mobile terminal. By way of example only, a user may wish to browse on a DTV terminal when watching the DTV pictures recently taken by a mobile terminal. She can enter a command via a remote control into the DTV terminal such that the DTV terminal sends a first data sharing request to the mobile terminal. The first data sharing request obtaining module 850 can then receive the first data sharing request sent from the DTV terminal by listening to the port corresponding to the listening port information contained in the network information associated with the mobile terminal.

A third data sharing request receiving and sending module 860 that obtains a third data sharing request forwarded by a DTV terminal, or that sends a third data sharing request to the DTV terminal based on network information associated with the DTV terminal, thereby allowing the DTV terminal to forward the third data sharing request to other mobile terminals. According to some embodiments, when a DTV terminal has established communication connections with multiple mobile terminals, a mobile terminal that has established communication connection with the DTV terminal can obtain from the DTV terminal information about other mobile terminals that have established communication connections with the DTV terminal. When a user of a first mobile terminal wishes to browse information in a second mobile terminal using the DTV terminal, she can send a third data sharing request to the DTV terminal using the third data sharing request receiving and sending module 860. After the DTV receives the third data sharing request, it can forward the third data sharing request to the second mobile terminal as requested.

Those skilled in the art will readily appreciate that the various functional modules in the DTV terminals and the mobile terminals in the example embodiments described above can be configured to carry out the various functions described in the example methods described above, and that the various functions described in the example methods described above can be carried out by the various functional modules in the DTV terminals and the mobile terminals in the example embodiments described above.

Figure 10:
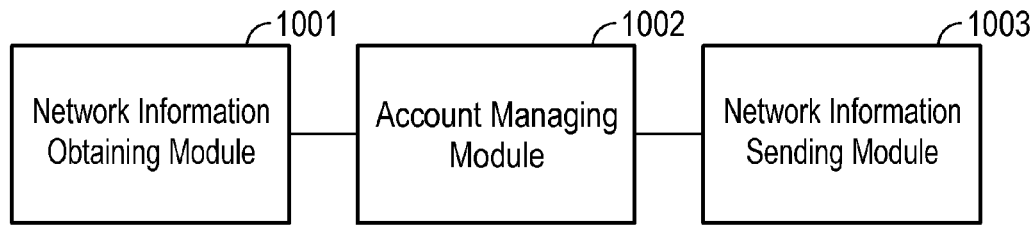
FIG. 10 is a schematic diagram illustrating an example of an arrangement of a server according to various embodiments.

FIG. 10 is a schematic diagram illustrating an example of an arrangement of a server according to various embodiments. According to some embodiments, a server can manage one or more online programs' login accounts. Examples of online programs include, but are not limited to, music playing software, audio/video playing software, network browsers, and instant messaging programs. The server can comprise:

A network information obtaining module 1001 that obtains network information associated with a DTV terminal sent from the DTV terminal or network information associated with a mobile terminal sent from the mobile terminal.

An account managing module 1002 that obtains login accounts from DTV terminals and mobile terminals, and that searches for opposite terminals with a relevant account in accordance with the DTV terminals' or the mobile terminals' login accounts. As used herein, a DTV terminal and a mobile terminal are each considered an "opposite terminal" to the other. According to some embodiments, a mobile terminal and a DTV terminal can have a same software application by which they log in a server. According to some other embodiments, a mobile terminal and a DTV terminal can have different software applications for logging in a server, as long as they have associated accounts or a common account. As used herein, a "relevant account" means that a program account logged in on a mobile terminal and a program account logged in on a DTV terminal are associated accounts, or accounts bound together, or a same account. According to some embodiments, a server can help a mobile terminal and a DTV terminal that have both logged in the server using a relevant account find each other in accordance with the login account information of the programs on the respective DTV terminal and mobile terminal, i.e., the server can help a mobile terminal or a DTV terminal find its opposite terminal based on the mobile terminal's or the DTV terminal's account login information.

A network information sending module 1003 that sends network information associated with a DTV terminal to a mobile terminal that has logged in an account relevant to the DTV terminal's login account, or to send network information associated with a mobile terminal to a DTV terminal that has logged in an account relevant to the mobile terminal's login account.

Figure 11:
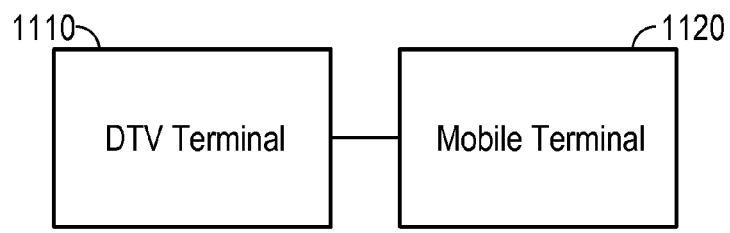
FIG. 11 is a schematic diagram illustrating an example of an arrangement of an information sharing system according to various embodiments.

FIG. 11 is a schematic diagram illustrating an example of an arrangement of an information sharing system according to various embodiments. According to some embodiments, the information sharing system can comprise a DTV terminal 1110 and a mobile terminal 1120. According to some embodiments, the information sharing system can comprise a DTV terminal and a mobile terminal, both in a home LAN.

According to some embodiments, a DTV terminal 1110, such as the DTV terminal illustrated in FIG. 6 hereinabove, can be used to establish a communication connection with a mobile terminal 1120, and to send data connection port information associated with the DTV terminal 1110 to the mobile terminal 1120, thereby obtaining multimedia files sent from the mobile terminal 1120.

According to some embodiments, a mobile terminal 1120, such as the mobile terminal illustrated in FIG. 8 hereinabove, can be used to establish a communication connection with a DTV terminal 1110, and to obtain data connection port information associated with the DTV terminal 1110, thereby sending multimedia files to the DTV terminal 1110.

Those skilled in the art can readily appreciate that a DTV terminal can be part of multiple information sharing systems, each with one or a plurality of mobile terminals. Similarly, a mobile terminal can be part of multiple information sharing systems, each with one or a plurality of DTV terminals.

Figure 12:
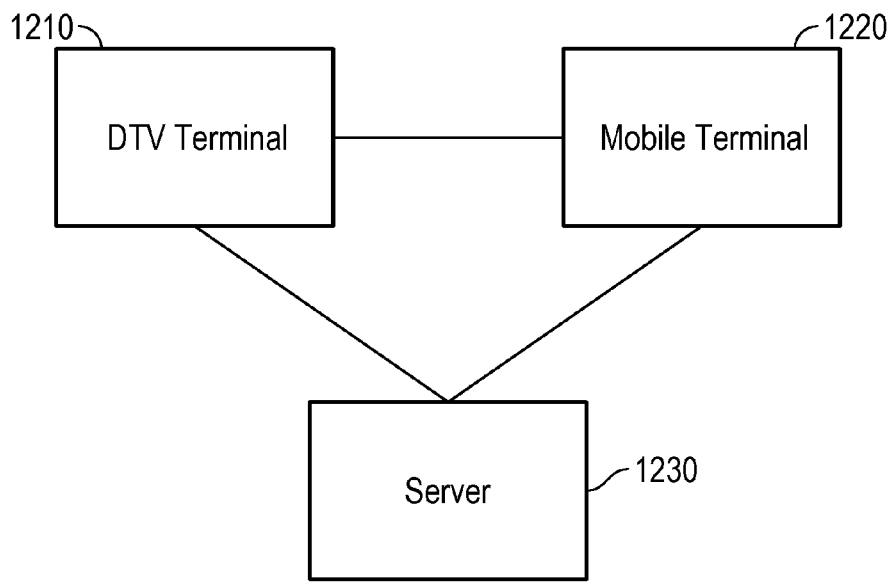
FIG. 12 is a schematic diagram illustrating an example of an arrangement of an information sharing system according to various embodiments.

FIG. 12 is a schematic diagram illustrating another example of an arrangement of an information sharing system according to various embodiments. According to some embodiments, the information sharing system can comprise a server 1230, a DTV terminal 1210 and a mobile terminal 1220. According to some embodiments, the DTV terminal and the mobile terminal are not within a same LAN.

According to some embodiments, a DTV terminal 1210, such as the DTV terminal illustrated in FIG. 5 hereinabove, can be used to establish a communication connection with a mobile terminal 1220 via a server 1230, and to send data connection port information associated with the DTV terminal 1210 to the mobile terminal 1220, thereby obtaining multimedia files sent from the mobile terminal 1220.

According to some embodiments, a mobile terminal 1220, such as the mobile terminal illustrated in FIG. 7 hereinabove, can be used to establish a communication connection with a DTV terminal 1210 via a server 1230, and to obtain data connection port information associated with the DTV terminal 1210, thereby sending multimedia files to the DTV terminal 1210.

According to some embodiments, a server 1230, such as the server illustrated in FIG. 10 hereinabove, can be used to find for a DTV terminal or a mobile terminal its opposite terminal that has logged in a relevant account in accordance with the account logged in from a program in the DTV terminal or the mobile terminal, and to send network information associated with each terminal to its opposite terminal, thereby establishing a communication connection between the DTV terminal 1210 and the mobile terminal 1220.

According to some embodiments, by establishing a wireless communication connection between a DTV terminal and a mobile terminal, one can accomplish sharing of information in the mobile terminal with the DTV terminal. As such, one can conveniently take advantage of a DTV terminal's superior multimedia playback effect in browsing or playing multimedia files stored in a mobile terminal, while avoiding the inconvenience brought about by using wired connections.

Although embodiments disclosed herein may be described and illustrated herein in terms of a mobile terminal sharing one or more multimedia files with a DTV terminal via wireless connection, it should be understood that the embodiments are not so limited, but can be additionally applicable to any terminal, any file, and any connection, i.e., any inter-terminal information sharing via any form(s) of connection between the terminals. Examples of inter-terminal methods of connection are well known to those skilled in the art, and includes, but are not limited to, via the Internet, a LAN (wired or wireless or both), mobile phone communication networks such as GSM, CDMA, TDMA, EDGE, GPRS, 2G, 3G, LTE, 4G, or any other method connecting two terminals, such as via a WiFi network, or such short-distance direct wireless connections as Bluetooth, infrared, or near field communication. Similarly, the connection between a terminal and a server can be via the Internet, a LAN (wired or wireless or both), mobile phone communication networks such as GSM, CDMA, TDMA, EDGE, GPRS, 2G, 3G, LTE, 4G, or any other method connecting a terminal to a server, which methods are also well known to those skilled in the art.

According to some embodiments, the network information of a terminal can optionally include an alias for the terminal. The alias can be either a name for the terminal given by the manufacturer of the terminal (e.g., the terminal's brand and model number), or a name given to the terminal by a user. Such an alias is useful for easy recognition and memorization than the terminal's network identification and listening port information. The alias of a terminal can be displayed by another terminal that has received the network information of the terminal, either alone or together with the rest of the network information. By way of example only, after a DTV terminal has saved a mobile terminal's network information it has obtained through a default UDP port, it can display that it has detected the mobile terminal, together with the mobile terminal's network information, particularly the mobile terminal's alias, if it was included as part of the mobile terminal's network information. In this way, a user, by looking at the DTV terminal's display, can easily know which mobile terminal's network information has been obtained by the DTV terminal.

According to some embodiments, before sharing one or more multimedia files with a DTV terminal, a mobile terminal can undergo a process of discovering and scanning multimedia files stored in its storage medium. The discovery and scanning process can be initiated automatically or upon user command. The scope of the discovery and scanning can be pre-determined (e.g., specific picture folders or the entire storage medium) or specified by a user upon prompt. According to some embodiments, once a discovery and scanning process is completed, all multimedia files (with proper file format as indicated by file extensions, either pre-determined or user-specified) are automatically shared with a DTV terminal. According to some other embodiments, after a discovery and scanning process, the mobile terminal can allow a user to select those files she wishes to be shared with a DTV terminal from all the results of the discovery and scanning process. According to some embodiments, the results of a discovery and scanning process, or at least the path information of the files, can be stored in the mobile device in a database or another form. According to some embodiments, the results of a discovery and scanning process, or at least the path information of the files, can be stored in the memory of the mobile device.

According to some embodiments, before being sent to a DTV terminal, a multimedia file has already been classified on the mobile terminal on which it is stored according to one or more criteria, which can be either pre-determined or user-specified. For example, a picture has been classified on a mobile terminal based on the time of its creation, or has been stored in a user-created folder. According to some embodiments, information about such classification of the multimedia files can also be shared with a DTV terminal. According to some embodiments, such classification information can be sent to a DTV terminal together with the multimedia files themselves. After the DTV terminal receives the multimedia files and the classification information, instead of running its own classification process, the DTV terminal can classify the multimedia files based on their existing classification information.

Where information shared with a DTV terminal by a mobile terminal includes one or more multimedia files, according to some embodiments, the DTV terminal has decoding capability with regard to the shared multimedia files. According to these embodiments, the multimedia files sent from the mobile terminal to the DTV terminal do not have to be decoded on the mobile terminal before being sent to the DTV terminal. According to some other embodiments, a DTV terminal does not have to have decoding capability with regard to multimedia files shared with it by a mobile terminal. According to these embodiments, the multimedia files sent from the mobile terminal to the DTV terminal can be decoded on the mobile terminal before being sent to the DTV terminal. Methods of decoding multimedia files on a DTV terminal or a mobile terminal are well known to those skilled in the art. Those skilled in the art will readily appreciate that the transmission of a decoded multimedia file can take longer than the transmission of the same multimedia file before decoding due to increased file size as a result of the decoding process. In addition, decoding a multimedia file, particularly a video file, on a mobile terminal can consume considerable processing power. Therefore, a preferred embodiment, especially in the case of sharing a video file with a DTV terminal to be played by the DTV terminal, is for the DTV terminal to have decoding capability and to transfer the video file from the mobile terminal to the DTV terminal without being decoded before the transfer.

According to some embodiments, what operations a DTV terminal can perform on a multimedia file after receiving it is related to the identity of the mobile terminal from which the multimedia file was sent to the DTV terminal, or to an account logged in from the mobile terminal. For example, a DTV terminal can only display but not edit or upload multimedia files sent from a certain mobile terminal or any mobile terminal that has logged in a certain account, while the DTV terminal can perform all operations such as displaying, editing, and uploading to multimedia files sent from another specific mobile terminal or any mobile terminal that has logged in another specific account. This can be achieved by setting up different operation privileges for different mobile terminals or accounts on the DTV terminal. Methods of setting up such privileges are well known to those skilled in the art.

Methods of interacting with a DTV terminal are well known to those skilled in the art. Examples of such methods include, but are not limited to, controlling certain functions of the DTV terminal using a remote control and, in the case of a DTV terminal with touch screen, touching the screen of the DTV terminal to input user commands. According to some embodiments, interactions with a DTV terminal can be accomplished using the mobile terminal from which multimedia files are shared with the DTV terminal, in which case, the mobile terminal can function like a remote control. For example, after sharing a number of picture files with a DTV terminal, a user can use the mobile terminal from which the picture files were shared to control the playback of the picture files on the DTV terminal, e.g., by forwarding or reversing the display of those picture files on the DTV terminal. According to some embodiments, a mobile terminal can function more than a remote control and be used to input data and commands into a DTV terminal as a keyboard would do. According to some embodiments, what functions of a DTV terminal a mobile terminal can control is related to the identity of the mobile terminal or to an account logged in from the mobile terminal. For example, a certain mobile terminal can only control the display and playback of the multimedia files it has sent to a DTV terminal but not the editing or uploading of them, while another mobile terminal can control all operations such as displaying, editing, and uploading to multimedia files sent from it to the DTV terminal. This difference may be due to the different identifications of these two mobile terminals, or the fact that the two mobile terminals have logged in two different accounts, respectively (i.e., if they have logged in a same account, the operations they can control the DTV terminal to perform with respect to the multimedia files sent to the DTV terminal from them will be the same). This can be achieved by setting up different operation privileges on the DTV terminal for different mobile terminals or accounts. Methods of setting up such privileges are well known to those skilled in the art.

According to some embodiments, a DTV terminal can allow a user to perform such editing operations on a multimedia file sent to the DTV terminal from a mobile terminal as cropping, sharpening, adjusting the brightness, adjusting the contrast, changing from color to greyscale, red-eye removal, and adding text or voice to a picture file. Methods of editing a multimedia file are well known to those skilled in the art. According to some embodiments, a DTV terminal can automatically perform certain editing operations on a multimedia file once it has received the file, without any user intervention, e.g., image sharpening and red-eye removal, etc., some of which may be specific to the DTV terminal's hardware or environment, e.g., adjusting the brightness or contrast of an image based on the DTV terminal's display capabilities and the ambient brightness. According to some embodiments, before uploading a multimedia file to the Internet from a DTV terminal, a user can change the file name and/or provide a comment on the file, which will be uploaded together with the file itself to the Internet, e.g., to a social networking website, forum, or blog, either directly or via a software application installed on the DTV terminal.

Those skilled in the art will readily appreciate that where ordinal numbers such as "first," "second," and "third" are used herein, they serve to distinguish and identify different modules, requests, terminals, and units, as applicable, with similar names, but do not imply any order, temporal, spatial, or otherwise.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method of sharing information by a mobile terminal with a digital television (DTV) terminal, comprising:
   establishing a communication connection between the DTV terminal and the mobile terminal, including:
      sending, by the mobile terminal, a network information associated with the mobile terminal to a server, the mobile terminal having a first software application logged into the server with a first account;
      searching, by the server, the DTV terminal having a second software application logged into the server with a second account associated with the first account, the second software application being different from the first software application; and
      sending, by the server, the network information associated with the mobile terminal to the DTV terminal; and
      sending, by the DTV terminal, a network information associated with the DTV terminal to the mobile terminal;
   sending data receiving port information associated with the DTV terminal to the mobile terminal, and
   receiving one or more multimedia files sent from the mobile terminal to the DTV terminal, wherein the one or more multimedia files are sent from the mobile terminal to the DTV terminal via a data receiving port on the DTV terminal in accordance with the data receiving port information associated with the DTV terminal;
   wherein:
      the second account is one of an account linked to the first account, an account bounded with the first account, and a same account as the first account;
      the first software application is one of a music playback software, an audio and video playback software, a network browser, and an instant messaging program; and the second software application is one of a music playback software, an audio and video playback software, a network browser, and an instant messaging program;

wherein sending the network information associated with the DTV terminal to the mobile terminal comprises sending the network information associated with the DTV terminal to the mobile terminal based on the network information associated with the mobile terminal;

wherein when the DTV terminal determines that the mobile terminal and the DTV terminal are in a same local network based on the network information associated with the mobile terminal, the DTV terminal sends the network information associated with the DTV terminal to the mobile terminal by broadcasting the network information associated with the DTV terminal; and when the DTV terminal determines that the mobile terminal and the DTV terminal are not in the same local network based on the network information associated with the mobile terminal, the DTV terminal sends the network information associated with the DTV terminal to the mobile terminal via the server.

2. The method of claim 1, wherein the network information associated with the mobile terminal is broadcast by the mobile terminal.

3. The method of claim 1, wherein sending the network information associated with the DTV terminal to the mobile terminal comprises broadcasting the network information associated with the DTV terminal.

4. The method of claim 1, wherein sending the network information associated with the DTV terminal to the mobile terminal comprises sending the network information associated with the DTV terminal to the server, thereby allowing the mobile terminal to obtain the network information associated with the DTV terminal via the server.

5. The method of claim 1, comprising:
classifying the received one or more multimedia files based on identification information obtained from the mobile terminal or a time of receipt of the one or more multimedia files.

6. A method of sharing information by a mobile terminal with a digital television (DTV) terminal, comprising:
establishing a communication connection between the mobile terminal and the DTV terminal, including:
sending, by the DTV terminal, a network information associated with the DTV terminal to a server, the DTV terminal having a first software application logged into the server with a first account;
searching, by the server, the mobile terminal having a second software application logged into the server with a second account associated with the first account, the second software application being different from the first software application; and
sending, by the server, the network information associated with the DTV terminal to the mobile terminal; and
sending, by the mobile terminal, a network information associated with the mobile terminal to the DTV terminal;
receiving, from the DTV terminal, a data receiving port information associated with the DTV terminal, and
sending one or more multimedia files to the DTV terminal via a data receiving port on the DTV terminal in accordance with the data receiving port information associated with the DTV terminal;

wherein:
the second account is one of an account linked to the first account, an account bounded with the first account, and a same account as the first account;
the first software application is one of a music playback software, an audio and video playback software, a network browser, and an instant messaging program; and
the second software application is one of a music playback software, an audio and video playback software, a network browser, and an instant messaging program;

wherein sending the network information associated with the mobile terminal to the DTV terminal comprises sending the network information associated with the mobile terminal to the DTV terminal based on the network information associated with the DTV terminal;

wherein when the DTV terminal determines that the mobile terminal and the DTV terminal are in a same local network based on the network information associated with the mobile terminal, the DTV terminal sends the network information associated with the DTV terminal to the mobile terminal by broadcasting the network information associated with the DTV terminal; and when the DTV terminal determines that the mobile terminal and the DTV terminal are not in the same local network based on the network information associated with the mobile terminal, the DTV terminal sends the network information associated with the DTV terminal to the mobile terminal via the server.

7. The method of claim 6, wherein the network information associated with the DTV terminal is broadcast by the DTV terminal.

8. The method of claim 6, wherein sending the network information associated with the mobile terminal to the DTV terminal comprises broadcasting the network information associated with the mobile terminal.

9. The method of claim 6, wherein sending the network information associated with the mobile to the DTV terminal comprises sending the network information associated with the mobile terminal to the server, thereby allowing the DTV terminal to obtain the network information associated with the mobile terminal via the server.

10. A digital television (DTV) terminal, comprising one or more processors, memory, a plurality of program modules stored in the memory and to be executed by the one or more processors, the plurality of program modules comprising:
a first connection establishing module that obtains a network information associated with a mobile terminal and that sends a network information associated with the DTV terminal to the mobile terminal, wherein:
the mobile terminal sends the network information associated with the mobile terminal to a server and has having a first software application logged into the server with a first account;
the server searches the DTV terminal having a second software application logged into the server with a second account associated with the first account, the second software application being different from the first software application; and
the server sends the network information associated with the mobile terminal to the DTV terminal,
a data receiving port information sending module that sends data receiving port information associated with the DTV terminal to the mobile terminal based on the network information associated with the mobile terminal, and a multimedia file obtaining module that obtains multimedia files sent from the mobile terminal to the DTV terminal, wherein the multimedia files are sent from the mobile terminal to the DTV terminal based on the network information and the data receiving port information associated with the DTV terminal;

wherein:

the second account is one of an account linked to the first account, an account bounded with the first account, and a same account as the first account;

the first software application is one of a music playback software, an audio and video playback software, a network browser, and an instant messaging program; and the second software application is one of a music playback software, an audio and video playback software, a network browser, and an instant messaging program;

wherein the server sending the network information associated with the mobile terminal to the DTV terminal comprises sending the network information associated with the mobile terminal to the DTV terminal based on the network information associated with the DTV terminal;

wherein when the DTV terminal determines that the mobile terminal and the DTV terminal are in a same local network based on the network information associated with the mobile terminal, the DTV terminal sends the network information associated with the DTV terminal to the mobile terminal by broadcasting the network information associated with the DTV terminal; and when the DTV terminal determines that the mobile terminal and the DTV terminal are not in the same local network based on the network information associated with the mobile terminal, the DTV terminal sends the network information associated with the DTV terminal to the mobile terminal via the server.

11. The method of claim 1, further comprising:

when the communication connection between the DTV terminal and the mobile terminal is established, the mobile terminal saving the network information associated with the DTV terminal and prompting a user that the mobile terminal has successfully registered with the DTV terminal.

12. The method of claim 1, further comprising:

establishing a communication connection between the DTV terminal and a second mobile terminal;

obtaining from the DTV terminal, by the mobile terminal, information about other terminals that have established communication connections with the DTV terminal, the other terminals including the second mobile terminal;

sending, by the mobile terminal, a data sharing request to the DTV terminal for contents on the second mobile terminal;

forwarding, by the DTV terminal, the data sharing request to the second mobile terminal; and sending, by the second mobile terminal, one or more multimedia files to the DTV terminal.

* * * * *